(No Model.)

L. H. WILLIAMS.
Liquor Mixer.

No. 237,150. Patented Feb. 1, 1881.

Witnesses
Wilmot Horton
Robt J Gaylord

Inventor
Lewis H. Williams
by Theo. G. Ellis.
Attorney

UNITED STATES PATENT OFFICE.

LINUS H. WILLIAMS, OF CROMWELL, CONNECTICUT, ASSIGNOR TO THE CROMWELL PLATE COMPANY, OF SAME PLACE.

LIQUOR-MIXER.

SPECIFICATION forming part of Letters Patent No. 237,150, dated February 1, 1881.

Application filed July 6, 1880. (No model.)

*To all whom it may concern:*

Be it known that I, LINUS H. WILLIAMS, of Cromwell, in the county of Middlesex and State of Connecticut, have invented certain new and useful Improvements in Liquor-Mixers; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My invention relates to a closed vessel constructed of two parts fitted into each other, intended for the purpose of mixing or shaking liquors or drinks, such as lemonade, sherry-cobblers, and the like, which are usually prepared with finely-broken ice and shaken to render them very cold.

The object of my invention is to provide a utensil which will more perfectly and conveniently effect the mixing and shaking than has heretofore been done with the ordinary cup and tumbler as has generally been practiced. The cup and tumbler being both conical in opposite directions, the edge only of the tumbler comes in contact with the inside surface of the cup, and does not ordinarily form a tight joint.

Figure 1:
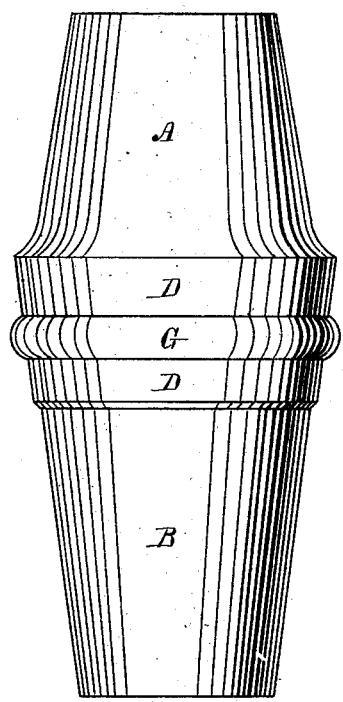
Figure 2:
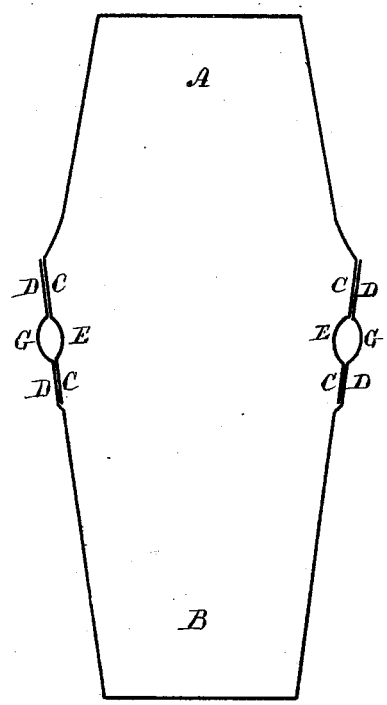
Figure 3:
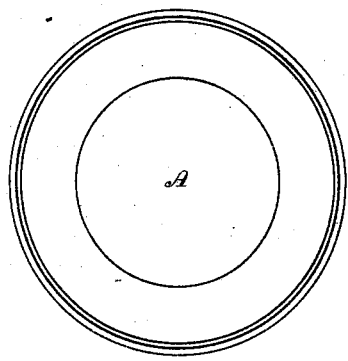

In the accompanying drawings illustrating my invention, Figure 1 is a side view of my improved mixer with the two parts placed together. Fig. 2 is a vertical section through the middle of the same. Fig. 3 is a top view.

A and B are two cups, preferably made of thin metal, which fit one into the other, as will be described. The cup B has its top of a conical form, flaring outward, and the cup A has its lower rim of a conical form, turning inward, so that the two conical edges of the cups fit each other for some distance and form a tight-fitting joint through the distance which they lap, as shown in the drawings at C C and D D.

E is a curved groove in the outside of the cup A, and G is a similar groove in the inside of the cup B, which are so placed as to be opposite each other when the two parts are together, as shown in the drawings, and form a pipe or channel around the vessel in the joint. This circular pipe or air-chamber is for the purpose of preventing leakage when the contents of the vessel are violently shaken, if the joint should not be closed perfectly tight. It forms a break in the joint, and at the same time serves as a receptacle for any liquid which might escape through the lower part of the joint, its force being expended in this chamber rather than up through the top part of the joint.

My improved liquor-mixer is used by having the mixture to be shaken poured into the lower cup, and then placing the other one in its place. The vessel is then shaken by hand, in the usual manner, and the contents poured out or used directly from the lower cup.

What I claim as my invention is—

1. A liquor-mixer composed of two cups, one having its edge flaring outward and the other having its edge turning inward, so as to form a tight conical joint, substantially as described.

2. In a liquor-mixer, the circular channel E G around the joint, substantially as and for the purpose described.

LINUS H. WILLIAMS.

Witnesses:
THEO. G. ELLIS,
WILMOT HORTON.